United States Patent
Zhang et al.

(10) Patent No.: US 9,935,490 B2
(45) Date of Patent: Apr. 3, 2018

(54) TERMINAL AND BATTERY CHARGING CONTROL DEVICE AND METHOD THEREOF FOR REALIZING OVERCURRENT AND/OR OVERVOLTAGE PROTECTION

(71) Applicant: GUANGDONG OPPO MOBILE TELECOMMUNICATIONS CORP., LTD., Dongguan (CN)

(72) Inventors: Jialiang Zhang, Dongguan (CN); Kewei Wu, Dongguan (CN); Jun Zhang, Dongguan (CN); Fuchun Liao, Dongguan (CN); Yuanxiang Hu, Dongguan (CN)

(73) Assignee: Guangdong Oppo Mobile Telelcommunications Corp., Ltd., Dongguan, Guangdong (CN)

( * ) Notice: Subject to any disclaimer, the term of this patent is extended or adjusted under 35 U.S.C. 154(b) by 33 days.

(21) Appl. No.: 15/115,045

(22) PCT Filed: May 7, 2014

(86) PCT No.: PCT/CN2014/076974
§ 371 (c)(1),
(2) Date: Jul. 28, 2016

(87) PCT Pub. No.: WO2015/113334
PCT Pub. Date: Aug. 6, 2015

(65) Prior Publication Data
US 2016/0344227 A1    Nov. 24, 2016

(30) Foreign Application Priority Data
Jan. 28, 2014   (CN) .......................... 2014 1 0042541

(51) Int. Cl.
H02J 7/00     (2006.01)
H02J 3/00     (2006.01)
(Continued)

(52) U.S. Cl.
CPC ............ H02J 7/027 (2013.01); H02J 7/0031 (2013.01); H02J 7/045 (2013.01);
(Continued)

(58) Field of Classification Search
CPC ....... Y02E 60/12; H02J 7/0042; H02J 7/0045; H02J 7/027; H02J 7/0031; H02J 7/045;
(Continued)

(56) References Cited

U.S. PATENT DOCUMENTS 8,513,923 B2    8/2013  Wang et al.
2002/0098859 A1*  7/2002  Murata ............ H04W 52/0277
                                                         455/522
(Continued)

FOREIGN PATENT DOCUMENTS

CN      101026309 A    9/1996
CN      1950998 A      4/2007
(Continued)

OTHER PUBLICATIONS

English Translation of the International Search Report and Written Opinion corresponding to International Patent Application No. PCT/CN2014/076974 dated Oct. 29, 2014, 9 pages.
(Continued)

*Primary Examiner* — Yalkew Fantu
*Assistant Examiner* — Mohammed J Sharief
(74) *Attorney, Agent, or Firm* — Lathrop Gage LLP

(57) ABSTRACT

The present disclosure relates to the technical field of charging. A terminal and a battery charging control device and method are provided. The battery charging control device including a battery connector, a main control circuit
(Continued)

and a quick charging switch circuit is adopted. During the regular charging or the quick charging, the main control circuit performs a data communication with the external power adapter via the communication interface, and obtains a charging voltage and a charging current for the battery; if the charging voltage is greater than a voltage threshold and/or the charging current is greater than a current threshold, the main control circuit sends a charging switch-off instruction, such that the controller controls the communication interface to switch off; if the charging voltage is less than or equal to the voltage threshold and the charging current is less than or equal to the current threshold, the main control circuit continues to obtain the charging voltage and the charging current.

19 Claims, 3 Drawing Sheets

(51) Int. Cl.
*H02J 3/20* (2006.01)
*H02J 7/02* (2016.01)
*H02J 7/04* (2006.01)

(52) U.S. Cl.
CPC .............. *H02J 2007/0037* (2013.01); *H02J 2007/0039* (2013.01); *H02J 2007/0096* (2013.01)

(58) Field of Classification Search
CPC ....... H02J 2007/0037; H02J 2007/0039; H02J 2007/0096; H02J 2007/004; H02J 7/0063; H02J 7/0065; H02J 7/0047; H02J 2007/0067; H01M 10/44; H01M 10/46; H01M 10/48; G01R 31/3648; H01L 27/0266; H02M 1/32; H02H 3/202; H02H 3/087; H02H 3/38; H02H 3/40; H03K 17/0822; H03K 19/00315; H03K 17/0826; H03F 1/52

USPC .......... 320/107, 134, 135, 136; 361/79, 91.1
See application file for complete search history.

(56) References Cited

U.S. PATENT DOCUMENTS

| | | | |
|---|---|---|---|
| 2009/0243552 A1* | 10/2009 | Jakes | G06F 1/26 320/160 |
| 2012/0133336 A1* | 5/2012 | Han | H02J 7/0093 320/145 |
| 2013/0175978 A1 | 7/2013 | Hsiao | |

FOREIGN PATENT DOCUMENTS

| | | |
|---|---|---|
| CN | 101888098 A | 11/2010 |
| CN | 101908771 A | 12/2010 |
| CN | 102013705 A | 4/2011 |
| CN | 102214941 A | 10/2011 |
| CN | 101013764 A | 8/2012 |
| CN | 102931693 A | 2/2013 |
| CN | 203747453 U | 7/2014 |
| EP | 1821384 A2 | 3/2003 |
| EP | 1796243 A2 | 5/2009 |

OTHER PUBLICATIONS

Chinese Patent Application No. 201410042541.0 First Office Action with English Translation, dated Jul. 17, 2015, 8 pages.
Chinese Patent Application No. 201410042541.0 Second Office Action with English Translation, dated Mar. 16, 2016, 7 pages.
Chinese Patent Application No. 201410042541.0 Notification to Grant Patent with English translation, dated Jul. 6, 2016, 1 page.
Chinese Patent Application No. 201410042541.0 Supplementary Search, dated Mar. 8, 2016, 1 page.
Chinese Patent Application No. 201410042541.0 First Search, dated Jul. 8, 2015, 1 page.
Chinese Patent Application No. 201610763798.4 Office Action dated Jan. 11, 2018, 5 pages.
European Patent Application No. 14881067.4 Extended Search and Opinion dated Nov. 23, 2017, 7 pages.

\* cited by examiner

TERMINAL AND BATTERY CHARGING CONTROL DEVICE AND METHOD THEREOF FOR REALIZING OVERCURRENT AND/OR OVERVOLTAGE PROTECTION

CROSS-REFERENCE TO RELATED APPLICATIONS

This application is a US national phase application based on International Application No. PCT/CN2014/076974, filed on May 7, 2014, which is based on and claims priority to Chinese Patent Application No. 201410042541.0, filed on Jan. 28, 2014, the entire contents of which are incorporated herein by reference.

TECHNICAL FIELD

The present disclosure generally relates to the charging technical field, and more particularly, to a terminal and a battery charging control device and method.

BACKGROUND

Currently, a battery of a terminal is typically charged by connecting a communication interface of the terminal with an external power adapter. However, in the related art, in order to reduce charging time during charging the battery, the charging current may be enhanced for performing a quick charging on the battery. However, whether the battery is charged in a conventional constant voltage mode or with increased charging current, if a charging current and/or charging voltage for the battery is too high during the charging, the battery will be damaged due to overvoltage and/or overcurrent charging. Therefore, in the related art, an overcurrent protection and/or an overvoltage protection cannot be realized for the battery during performing a regular charging or quick charging on the battery of the terminal.

SUMMARY

At least one embodiment of the present disclosure is to provide a battery charging control device, and to solve a problem in the related art that an overcurrent protection and/or an overvoltage protection cannot be realized for a battery during performing a regular charging or quick charging on the battery of a terminal.

An embodiment of the present disclosure is realized as follows. There is provided a battery charging control device coupled with a battery and a controller in a terminal, in which the battery is charged by obtaining direct current from an external power adapter via a communication interface of the terminal, and the controller controls the communication interface of the terminal to switch on or off. The battery charging control device includes a battery connector, a main control circuit and a quick charging switch circuit.

The battery connector is coupled with an electrode of the battery, the main control circuit is coupled with the battery connector, a first switch control terminal and a second switch control terminal of the main control circuit are coupled with a first controlled terminal and a second controlled terminal of the quick charging switch circuit respectively, both a first communication terminal and a second communication terminal of the main control circuit are coupled with the communication interface, the main control circuit is also coupled with the controller, an input terminal of the quick charging switch circuit is coupled with a power wire of the communication interface, and an output terminal of the quick charging switch circuit is coupled with the battery connector.

When a regular charging is performed on the battery, the main control circuit controls the quick charging switch circuit to switch off; when a quick charging is performed on the battery, the main control circuit controls the quick charging switch circuit to switch on, and direct current is introduced into the quick charging switch circuit via the communication interface, so as to charge the battery via the battery connector.

During the regular charging or the quick charging, the main control circuit performs a data communication with the external power adapter via the communication interface, and obtains a charging voltage and a charging current for the battery; if the charging voltage is greater than a voltage threshold and/or the charging current is greater than a current threshold, the main control circuit sends a charging switch-off instruction, such that the controller controls the communication interface to switch off; if the charging voltage is less than or equal to the voltage threshold and the charging current is less than or equal to the current threshold, the main control circuit continues to obtain the charging voltage and the charging current.

An embodiment of the present disclosure is to provide a terminal, including a communication interface, a controller, a battery and a battery charging control device described above.

An embodiment of the present disclosure is to provide a battery charging control method based on the battery charging control device described above. The battery charging control method can include following:

the main control circuit performs a data communication with the external power adapter, and obtains a charging voltage and a charging current for the battery;

the main control circuit determines whether the charging voltage is greater than a voltage threshold, and determines whether the charging current is greater than a current threshold. If the charging voltage is greater than the voltage threshold and/or the charging current is greater than the current threshold, the main control circuit sends a charging switch-off instruction, such that the controller controls the communication interface to switch off. If the charging voltage is less than or equal to the voltage threshold and the charging current is less than or equal to the current threshold, the main control circuit continues to perform the data communication with the external power adapter and obtain the charging voltage and the charging current for the battery.

In an embodiment of the present disclosure, the battery charging control device including the battery connector, the main control circuit and the quick charging switch circuit is adopted. During the regular charging or the quick charging for the battery in the terminal, the main control circuit performs a data communication with the external power adapter via the communication interface of the terminal, obtains the charging voltage and the charging current for the battery, and sends the charging switch-off instruction if the charging voltage is greater than the voltage threshold and/or the charging current is greater than the current threshold, such that the controller of the terminal controls the communication interface of the terminal to switch off, thus realizing the overvoltage protection and/or the overcurrent protection for the battery.

DETAILED DESCRIPTION

To make the objectives, the technical solutions, and the advantages of embodiments of the present disclosure clearer, the technical solutions in embodiments of the present disclosure are hereinafter described clearly and completely with reference to the accompanying drawings in embodiments of the present disclosure. It should be understood that, the specific embodiments described herein are merely used for explanation, but not used to limit the present disclosure.

Figure 1:
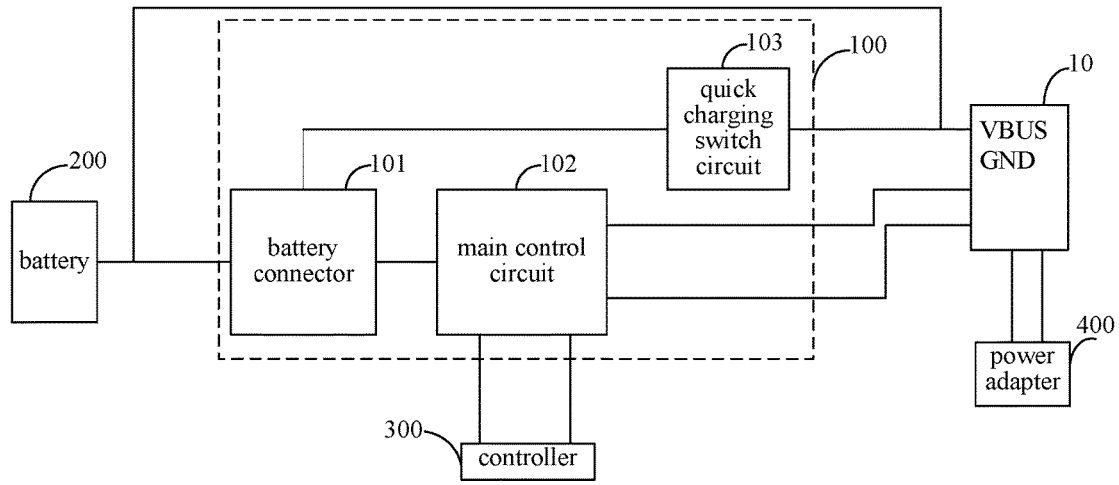
FIG. 1 is a block diagram of a battery charging control device according to an embodiment of the present disclosure.

FIG. 1 illustrates a block diagram of a battery charging control device according to an embodiment of the present disclosure. For illustration purposes, only parts related to embodiments of the present disclosure are shown, which will be described in detail in the following.

The battery charging control device 100 provided in embodiments of the present disclosure is coupled with a battery 200 and a controller 300 in a terminal respectively. The battery 200 is charged by obtaining direct current from an external power adapter 400 via a communication interface 10 of the terminal. The controller 300 controls the communication interface 10 of the terminal to switch on or off.

The battery charging control device 100 includes a battery connector 101, a main control circuit 102 and a quick charging switch circuit 103. The battery connector 101 is coupled with an electrode of the battery 200. The main control circuit 102 is coupled with the battery connector 101. A first switch control terminal and a second switch control terminal of the main control circuit 102 are coupled with a first controlled terminal and a second controlled terminal of the quick charging switch circuit 103 respectively. Both a first communication terminal and a second communication terminal of the main control circuit 102 are coupled with the communication interface 10 of the terminal. The main control circuit 102 is also coupled with the controller 300 of the terminal. An input terminal of the quick charging switch circuit 103 is coupled with a power wire VBUS of the communication interface 10 of the terminal, and an output terminal of the quick charging switch circuit 103 is coupled with the battery connector 101.

When a regular charging is performed on the battery 200, the main control circuit 102 controls the quick charging switch circuit 103 to switch off. When a quick charging is performed on the battery 200, the main control circuit 102 controls the quick charging switch circuit 103 to switch on, and direct current is introduced into the quick charging switch circuit 103 via the communication interface 10 of the terminal for charging the battery 200 via the battery connector 101, such that the charging current for the battery 200 is increased, and thus quick charging is realized.

During the above regular charging or quick charging, the main control circuit 102 performs a data communication with the power adapter 400 via the communication interface 10 of the terminal, and obtains a charging voltage and a charging current for the battery 200. If the above charging voltage is greater than a voltage threshold and/or the above charging current is greater than a current threshold, the main control circuit 102 sends a charging switch-off instruction, such that the controller 300 controls the communication interface 10 of the terminal to switch off. If the above charging voltage is less than or equal to the voltage threshold and the above charging current is less than or equal to the current threshold, the main control circuit 102 continues to obtain the charging voltage and the charging current.

Figure 2:
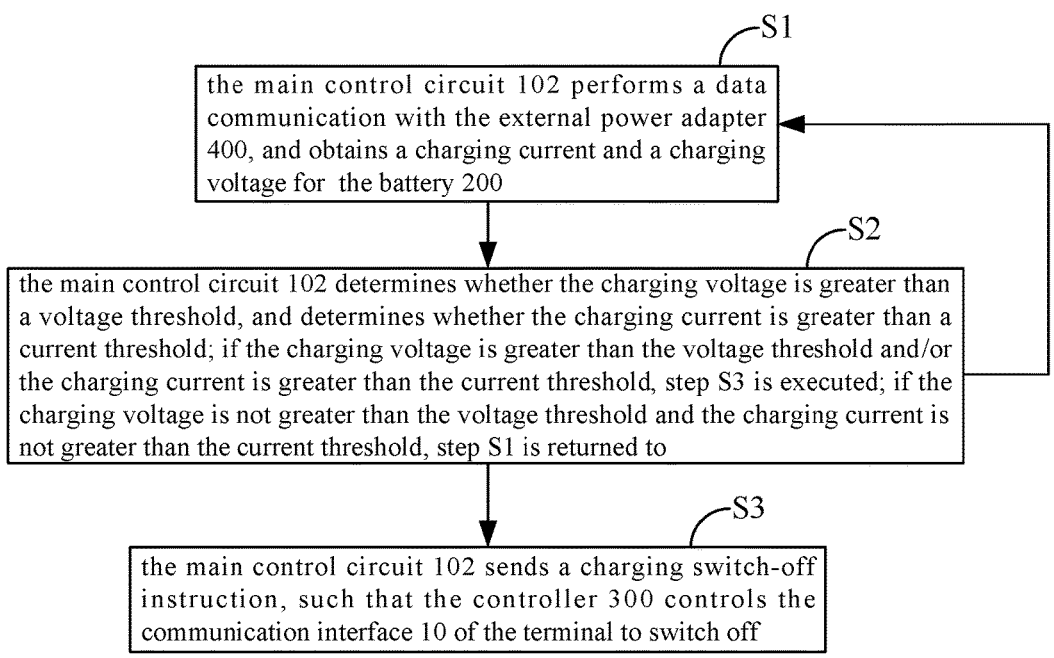
FIG. 2 is a flow chart of a battery charging control method based on a battery charging control device shown in FIG. 1.

Based on the battery charging control device 100 shown in FIG. 1, embodiments of the present disclosure may further provide a battery charging control method. As shown in FIG. 2, the battery charging control method includes following acts.

In block S1, the main control circuit 102 performs a data communication with the external power adapter 400, and obtains the charging current and the charging voltage for the battery 200.

In block S2, the main control circuit 102 determines whether the charging voltage is greater than the voltage threshold, and determines whether the charging current is greater than the current threshold. If the charging voltage is greater than the voltage threshold and/or the charging current is greater than the current threshold, block S3 is executed. If the charging voltage is less than or equal to the voltage threshold and the charging current is less than or equal to the current threshold, block S1 is returned to.

In block S3, the main control circuit 102 sends a charging switch-off instruction, such that the controller 300 controls the communication interface 10 of the terminal to switch off.

In an embodiment, block S1 specifically includes following acts.

The main control circuit 102 sends a charging parameter obtaining request to the power adapter 400.

The power adapter 400 feeds back charging voltage information and charging current information to the main control circuit 102 according to the charging parameter obtaining request.

The main control circuit 102 obtains the charging current and the charging voltage for the battery 200 from the above charging current information and charging voltage information.

Figure 3:
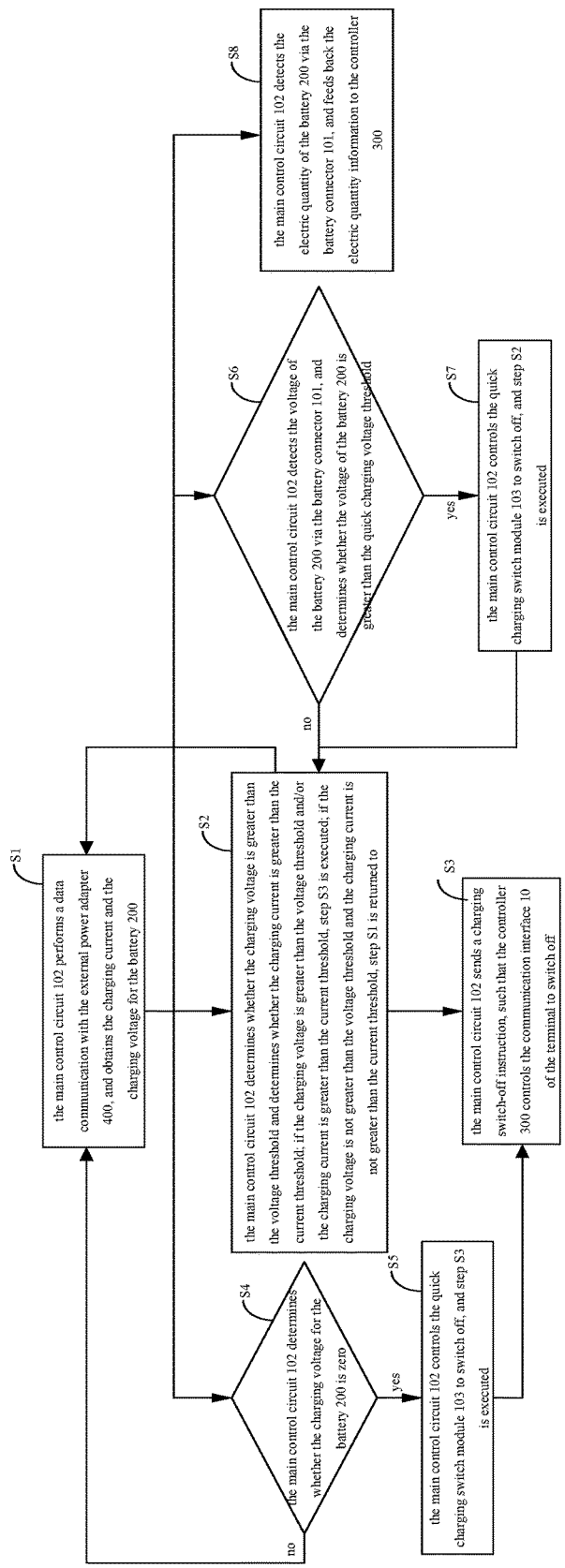
FIG. 3 is another flow chart of a battery charging control method based on a battery charging control device shown in FIG. 1.

When the quick charging is performed on the battery 200, following acts may be included (as shown in FIG. 3) after block S1, so as to switch off the quick charging process and the communication interface 10 of the terminal in time if the power adapter 400 is suddenly decoupled from the communication interface 10 of the terminal.

In block S4, the main control circuit 102 determines whether the charging voltage for the battery 200 is zero, if yes, block S5 is executed, and if no, block S1 is returned to.

In block S5, the main control circuit 102 controls the quick charging switch circuit 103 to switch off, and block S3 is executed.

When the quick charging is performed on the battery 200, the controller 300 may feedback a quick charging switch-off instruction to the main control circuit 102 at an abnormal battery temperature if the terminal has a function of detecting a temperature of the battery, such that the main control circuit 102 may control the quick charging switch circuit 103 to switch off according to the quick charging switch-off instruction.

When the quick charging is performed on the battery 200, following acts may be included (as shown in FIG. 3) after block S1, such that it can switch back to the convention charging process after completing the quick charging process.

In block S6, the main control circuit 102 detects the voltage of the battery 200 via the battery connector 101, and determines whether the voltage of the battery 200 is greater than the quick charging voltage threshold (e.g. 4.35V), if yes, block S7 is executed, and if no, block S2 is executed.

In block S7, the main control circuit 102 controls the quick charging switch circuit 103 to switch off, and then block S2 is executed.

When the quick charging is performed on the battery 200, the main control circuit 102 may also detect the electric quantity of the battery 200 via the battery connector 101, and feedback the electric quantity information to the controller 300 of the terminal, such that the terminal displays the electric quantity of the battery 200. Thus, the battery charging control method may further include following acts executed simultaneously with block S6.

In block S8, the main control circuit 102 detects the electric quantity of the battery 200 via the battery connector 101 and feeds back the electric quantity information to the controller 300.

Figure 4:
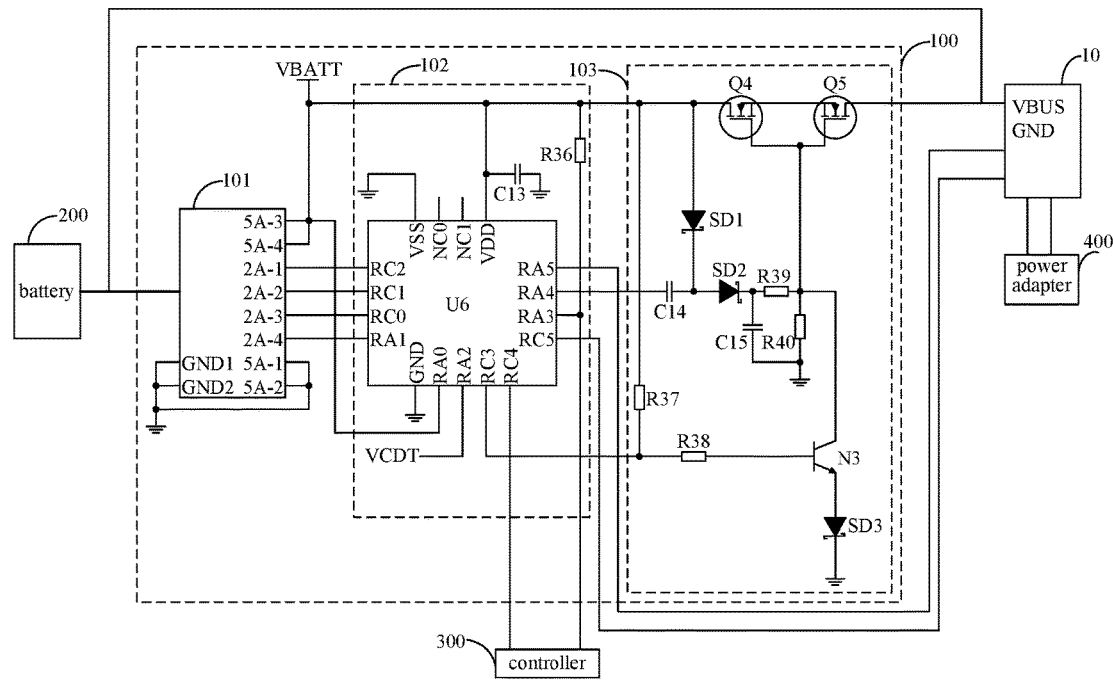
FIG. 4 is a schematic circuit diagram of a battery charging control device according to an embodiment of the present disclosure.

FIG. 4 shows a schematic circuit diagram of a battery charging control device according to an embodiment of the present disclosure. For illustration purposes, only parts related to embodiments of the present disclosure are shown, which will be described in detail in the following.

The main control circuit 102 includes a main controller U6, a thirteenth capacitor C13 and a thirty-sixth resistor R36.

A first pin 5A-1 and a second pin 5A-2 of the battery connector 101 are commonly grounded. A first ground pin GND1 and a second ground pin GND2 of the battery connector 101 are commonly grounded. A first input/output pin RA0 of the main controller U6 is coupled with a seventh pin 5A-3 and an eighth pin 5A-4 of the battery connector 101 respectively. A second input/output pin RA1, a seventh input/output pin RC0, an eighth input/output pin RC1 and a ninth input/output pin RC2 of the main controller U6 are coupled with a sixth pin 2A-4, a fifth pin 2A-3, a fourth pin 2A-2 and a third pin 2A-1 of the battery connector 101 respectively. Each of an analog ground pin VSS and a ground pin GND of the main controller U6 is grounded. Both a first vacant pin NC0 and a second vacant pin NC1 of the main controller U6 are suspended. A power pin VDD of the main controller U6 and a first terminal of the thirteenth capacitor C13 are commonly coupled with the seventh pin 5A-3 and the eighth pin 5A-4 of the battery connector 101. A fourth input/output pin RA3 and an eleventh input/output pin RC4 are coupled with the controller 300. The thirty-sixth resistor R36 is coupled between the fourth input/output pin RA3 and the power pin VDD of the main controller U6. A fifth input/output pin RA4 and a tenth input/output pin RC3 of the main controller U6 are configured as the first switch control terminal and the second switch control terminal of the main control circuit 102 respectively. A sixth input/output pin RA5 and a twelfth input/output pin RC5 of the main controller U6 are configured as the first communication terminal and the second communication terminal of the main control circuit 102 respectively. The main controller U6 may specifically be a single chip microcomputer whose model may be PIC12LF1501, PIC12F1501, PIC16LF1503, PIC16F1503, PIC16LF1507, PIC16F1507, PIC16LF1508, PIC16F1508, PIC16LF1509 or PIC16F1509.

The quick charging switch circuit 103 includes a thirty-seventh resistor R37, a fourteenth capacitor C14, a first Schottky diode SD1, a second Schottky diode SD2, a third Schottky diode SD3, a fifteenth capacitor C15, a thirty-eighth resistor R38, a thirty-ninth resistor R39, a fortieth resistor R40, a third NPN triode N3, a fourth NMOS transistor Q4 and a fifth NMOS transistor Q5.

A first terminal of the fourteenth capacitor C14 is configured as the first controlled terminal of the quick charging switch circuit 103. A common node between a first terminal of the thirty-seventh resistor R37 and a first terminal of the thirty-eighth resistor R38 is configured as the second controlled terminal of the quick charging switch circuit 103. A second terminal of the thirty-seventh resistor R37 and an anode of the first Schottky diode SD1 are commonly coupled to a source of the fourth NMOS transistor Q4. A second terminal of the thirty-eighth resistor R38 is coupled to a base of the third NPN triode N3. A second terminal of the fourteenth capacitor C14 and a cathode of the first Schottky diode SD1 are commonly coupled to an anode of the second Schottky diode SD2. A first terminal of the thirty-ninth resistor R39 and a first terminal of the fifteenth capacitor C15 are commonly coupled to a cathode of the second Schottky diode SD2. Each of a second terminal of the thirty-ninth resistor R39, a first terminal of the fortieth resistor R40, and a collector of the third NPN triode N3 is coupled to a grid of the fourth NMOS transistor Q4 and a gird of the fifth NMOS transistor Q5. A second terminal of the fortieth resistor R40 and a second terminal of the fifteenth capacitor C15 are commonly grounded. The source of the fourth NMOS transistor Q4 is configured as the output terminal of the quick charging switch circuit 103 and coupled with the seventh pin 5A-3 and the eighth pin 5A-4 of the battery connector 101. A drain of the fourth NMOS transistor Q4 is coupled with a drain of the fifth NMOS transistor Q5. A source of the fifth NMOS transistor Q5 is configured as the input terminal of the quick charging control circuit 103. An emitter of the third NPN triode N3 is coupled with an anode of the third Schottky diode SD3, and a cathode of the third Schottky diode SD3 is grounded.

For the battery charging control device shown in FIG. 4, the main controller U6 performs a data communication with the controller 300 via the fourth input/output pin RA3 and the eleventh input/output pin RC4 thereof, and transmits the voltage information and electric quantity information of the battery 200 to the controller 300. Moreover, the main controller U6 may also determine according to the voltage of the battery 200 whether a quick charging process on the battery 200 is completed, and if yes, outputs high level voltage for turning on the third NPN triode N3, so as to control the fourth NMOS transistor Q4 and the fifth NMOS transistor Q5 to switch off. During charging the battery 200, if the power adapter 400 is suddenly decoupled from the battery 200, the main controller U6 will detect that the charging voltage for the battery 200 is zero, and then output the high level voltage for turning on the third NPN triode N3 so as to control the fourth NMOS transistor Q4 and the fifth NMOS transistor Q5 to switch off, and feed back the charging switch-off instruction to the controller 300 for controlling the communication interface 10 of the terminal to switch off. In addition, if the terminal may detect the temperature of the battery 200, the controller 300 feeds back the quick charging switch-off instruction to the main controller U6 when the temperature is abnormal, and the main controller U6 outputs high level voltage according to the quick charging switch-off instruction for turning on the third NPN triode N3, such that the fourth NMOS transistor Q4 and the fifth NMOS transistor Q5 are controlled to switch off.

When the quick charging is performed on the battery 200, direct current is introduced into the quick charging switch circuit 103 via the communication interface 10 of the terminal as follows, such that the battery 200 is charged via the battery connector 101. The main controller U6 outputs high level voltage via the fifth input/output pin RA4 thereof for controlling the fourth NMOS transistor Q4 and the fifth NMOS transistor Q5 to switch on, and controls the third NPN triode N3 to switch off via the tenth input/output pin RC3 thereof, such that the direct current is introduced via the communication interface 10 of the terminal for charging the battery 200. Since the battery 200 itself has already obtained direct current from the power adapter 400 via the communication interface 10, introducing the direct current into the quick charging switch circuit 103 via the communication interface 10 of the terminal to charge the battery 200 via the battery connector 101 may increase the charging current for the battery 200, and thus the quick charging for the battery 200 is realized.

Figure 5:
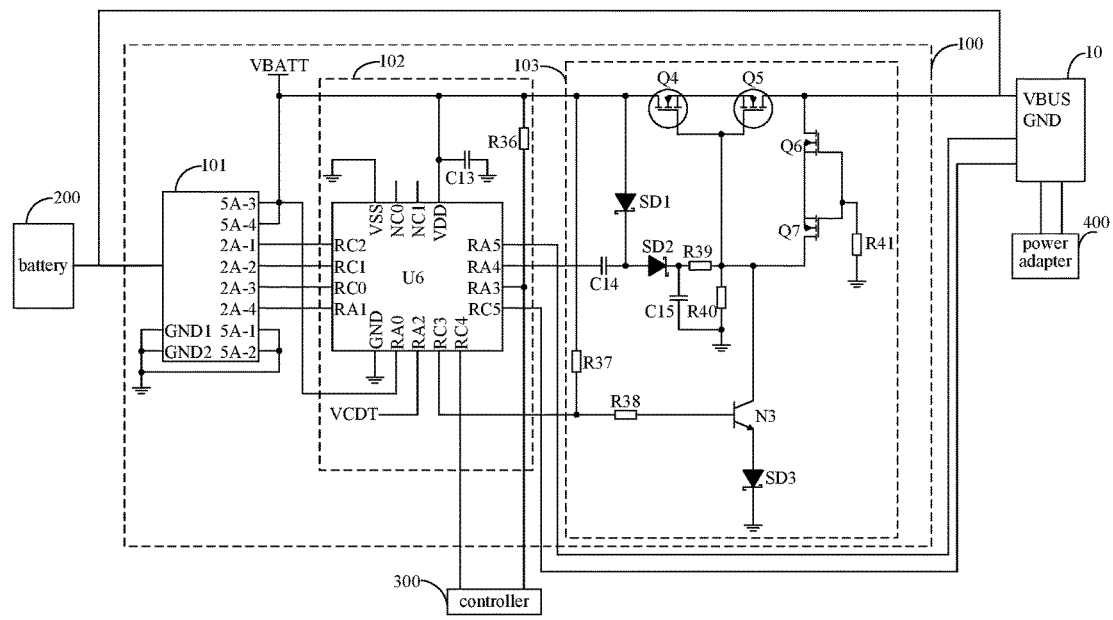
FIG. 5 is another schematic circuit diagram of a battery charging control device according to an embodiment of the present disclosure.

In addition, when the quick charging is performed on the battery 200, if the power wire VBUS and the ground wire GND of the communication interface 10 of the terminal are grounded and coupled to direct current input respectively, i.e., if a power source reversal connection occurs for the communication interface 10, the input terminal of the quick charging switch circuit 103 is grounded, and ground ends in various modules of the battery charging control device 100 are coupled to direct current, and thus in order to avoid damages to elements, as shown in FIG. 5, the quick charging switch circuit 103 may further include a sixth NMOS transistor Q6, a seventh NMOS transistor Q7 and a forty-first resistor R41. A source of the sixth NMOS transistor Q6 is coupled with the source of the fifth NMOS transistor Q5, a drain of the sixth NMOS transistor Q6 is coupled with a drain of the seventh NMOS transistor Q7, a source of the seventh NMOS transistor Q7 is coupled with the collector of the third NPN triode N3, a grid of the sixth NMOS transistor Q6 and a grid of the seventh NMOS transistor Q7 are commonly coupled to a first terminal of the forty-first resistor R41, and a second terminal of the forty-first resistor R41 is grounded.

When the above reversal connection fault occurs, the direct current is introduced from ground into the second terminal of the forty-first resistor R41 for driving the sixth NMOS transistor Q6 and the seventh NMOS transistor Q7 to switch off, such that direct current input into the battery charging control device 100 via the ground cannot form a loop, thus protecting the elements from being damaged.

Embodiments of the present disclosure also provide a terminal. The terminal includes the above communication interface 10, controller 300, battery 200 and battery charging control device 100.

In conclusion, in the present disclosure, the battery charging control device 100 including the battery connector 101, the main control circuit 102 and the quick charging switch circuit 103 is adopted. During the regular charging or the quick charging for the battery 200 in the terminal, the main control circuit 102 performs a data communication with the external power adapter 400 via the communication interface 10 of the terminal, obtains the charging voltage and the charging current for the battery 200, and sends the charging switch-off instruction if the charging voltage is greater than the voltage threshold and/or the charging current is greater than the current threshold, such that the controller 300 controls the communication interface 10 of the terminal to switch off, thus realizing the overvoltage protection and/or the overcurrent protection for the battery 200.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure.

What is claimed is:

1. A battery charging control device, configured to be coupled with a battery and a controller in a terminal, the battery being charged by obtaining direct current from an external power adapter via a communication interface of the terminal, the controller controlling the communication interface of the terminal to switch on or off, wherein, the battery charging control device comprises a battery connector, a main control circuit and a quick charging switch circuit;

the battery connector is configured to be coupled with an electrode of the battery, the main control circuit is coupled with the battery connector, a first switch control terminal and a second switch control terminal of the main control circuit are coupled with a first controlled terminal and a second controlled terminal of the quick charging switch circuit respectively, both a first communication terminal and a second communication terminal of the main control circuit are coupled with the communication interface, the main control circuit is also coupled with the controller, an input terminal of the quick charging switch circuit is coupled with a power wire of the communication interface, and an output terminal of the quick charging switch circuit is coupled with the battery connector;

when a regular charging is performed on the battery, the main control circuit controls the quick charging switch module circuit to switch off; when a quick charging is performed on the battery, the main control circuit controls the quick charging switch circuit to switch on, and the direct current is introduced into the quick charging switch circuit via the communication interface, so as to charge the battery via the battery connector;

during the regular charging or the quick charging, the main control circuit performs a data communication with the external power adapter via the communication interface, and obtains a charging voltage and a charging current for the battery; if the charging voltage is greater than a voltage threshold and/or the charging current is greater than a current threshold, the main control circuit sends a charging switch-off instruction, such that the controller controls the communication interface to switch off; if the charging voltage is less than or equal to the voltage threshold and the charging current is less than or equal to the current threshold, the main control circuit continues to obtain the charging voltage and the charging current.

2. The battery charging control device according to claim 1, wherein, the main control circuit comprises a main controller, a thirteenth capacitor and a thirty-sixth resistor;

a first pin and a second pin of the battery connector are commonly grounded, a first ground pin and a second ground pin of the battery connector are commonly grounded, a first input/output pin of the main controller is coupled to a seventh pin and an eighth pin of the battery connector respectively, a second input/output pin, a seventh input/output pin, an eighth input/output pin and a ninth input/output pin of the main controller are coupled with a sixth pin, a fifth pin, a fourth pin and a third pin of the battery connector respectively, both an analog ground pin and a ground pin of the main controller are grounded, both a first vacant pin and a second vacant pin of the main controller are suspended, a power pin of the main controller and a first terminal of the thirteenth capacitor are commonly coupled to the seventh pin and the eighth pin of the battery connector, a fourth input/output pin and an eleventh input/output pin of the main controller are coupled with the controller, the thirty-sixth resistor is coupled between the fourth input/output pin and the power pin of the main controller, a fifth input/output pin and a tenth input/output pin of the main controller are configured as the first switch control terminal and the second switch control terminal of the main control circuit respectively, a sixth input/output pin and a twelfth input/output pin of the main controller are configured as the first communication terminal and the second communication terminal of the main control circuit respectively.

3. The battery charging control device according to claim 2, wherein, the main controller is a single chip microcomputer.

4. The battery charging control device according to claim 1, wherein, the quick charging switch circuit comprises a thirty-seventh resistor, a fourteenth capacitor, a first Schottky diode, a second Schottky diode, a third Schottky diode, a fifteenth capacitor, a thirty-eighth resistor, a thirty-ninth resistor, a fortieth resistor, a third NPN triode, a fourth NMOS transistor and a fifth NMOS transistor;

a first terminal of the fourteenth capacitor is configured as the first controlled terminal of the quick charging switch circuit, a common node between a first terminal of the thirty-seventh resistor and a first terminal of the thirty-eighth resistor is configured as the second controlled terminal of the quick charging switch circuit, a second terminal of the thirty-seventh resistor and an anode of the first Schottky diode are commonly coupled to a source of the fourth NMOS transistor, a second terminal of the thirty-eighth resistor is coupled to a base of the third NPN triode, a second terminal of the fourteenth capacitor and a cathode of the first Schottky diode are commonly coupled to an anode of the second Schottky diode, a first terminal of the thirty-ninth resistor and a first terminal of the fifteenth capacitor are commonly coupled to a cathode of the second Schottky diode, each of a second terminal of the thirty-ninth resistor, a first terminal of the fortieth resistor, and a collector of the third NPN triode is coupled to a grid of the fourth NMOS transistor and a gird of the fifth NMOS transistor, a second terminal of the fortieth resistor and a second terminal of the fifteenth capacitor are commonly grounded, the source of the fourth NMOS transistor is configured as the output terminal of the quick charging switch module and coupled with the seventh pin and the eighth pin of the battery connector, a drain of the fourth NMOS transistor is coupled with a drain of the fifth NMOS transistor, a source of the fifth NMOS transistor is configured as the input terminal of the quick charging switch circuit, an emitter of the third NPN triode is coupled with an anode of the third Schottky diode, and a cathode of the third Schottky diode is grounded.

5. The battery charging control device according to claim 4, wherein, the quick charging switch circuit further comprises a sixth NMOS transistor, a seventh NMOS transistor and a forty-first resistor; a source of the sixth NMOS transistor is coupled with the source of the fifth NMOS transistor, a drain of the sixth NMOS transistor is coupled with a drain of the seventh NMOS transistor, a source of the seventh NMOS transistor is coupled with the collector of the third NPN triode, a grid of the sixth NMOS transistor and a grid of the seventh NMOS transistor are commonly coupled to a first terminal of the forty-first resistor, and a second terminal of the forty-first resistor is grounded.

6. The battery charging control device according to claim 5, wherein, in response to a power source reversal connection for the communication interface, when the quick charging is performed on the battery, the direct current is introduced from ground into the second terminal of the forty-first resistor for driving the sixth NMOS transistor and the seventh NMOS transistor to switch off.

7. The battery charging control device according to claim 4, wherein, when the quick charging is performed on the battery, the controller feeds back a quick charging switch-off instruction to the main control circuit at an abnormal battery temperature, such that the main control circuit controls the quick charging switch circuit to switch off according to the quick charging switch-off instruction.

8. The battery charging control device according to claim 7, wherein, in response to the main control circuit receiving the quick charging switch-off instruction, the main controller outputs high level voltage according to the quick charging switch-off instruction for turning on the third NPN triode, such that the fourth NMOS transistor and the fifth NMOS transistor are controlled to switch off.

9. The battery charging control device according to claim 4, wherein, the main controller outputs high level voltage via a fifth input/output pin of the main controller for controlling the fourth NMOS transistor and the fifth NMOS transistor to switch on, and controls the third NPN triode to switch off via a tenth input/output pin of the main controller, such that the direct current is introduced into the quick charging switch circuit via the communication interface.

10. A terminal, comprising: a communication interface, a controller and a battery, wherein, the terminal further comprises a battery charging control device; wherein the battery charging control device is coupled with a battery and a controller in a terminal; the battery is charged by obtaining direct current from an external power adapter via a communication interface of the terminal, the controller controls the communication interface of the terminal to switch on or off, and the battery charging control device comprises a battery connector, a main control circuit and a quick charging switch circuit;

the battery connector is coupled with an electrode of the battery, the main control circuit is coupled with the battery connector, a first switch control terminal and a second switch control terminal of the main control circuit are coupled with a first controlled terminal and a second controlled terminal of the quick charging switch circuit respectively, both a first communication terminal and a second communication terminal of the main control circuit are coupled with the communication interface, the main control circuit is also coupled with the controller, an input terminal of the quick charging switch circuit is coupled with a power wire of the communication interface, and an output terminal of the quick charging switch circuit is coupled with the battery connector;

when a regular charging is performed on the battery, the main control circuit controls the quick charging switch circuit to switch off; when a quick charging is performed on the battery, the main control circuit controls the quick charging switch circuit to switch on, and the direct current is introduced into the quick charging switch circuit via the communication interface, so as to charge the battery via the battery connector;

during the regular charging or the quick charging, the main control circuit performs a data communication with the external power adapter via the communication interface, and obtains a charging voltage and a charging current for the battery; if the charging voltage is greater than a voltage threshold and/or the charging current is greater than a current threshold, the main control circuit sends a charging switch-off instruction, such that the controller controls the communication interface to switch off; if the charging voltage is less than or equal to the voltage threshold and the charging current is less than or equal to the current threshold, the main control circuit continues to obtain the charging voltage and the charging current.

11. A battery charging control method, based on a battery charging control device, wherein, the battery charging control device is coupled with a battery and a controller in a terminal; the battery is charged by obtaining direct current from an external power adapter via a communication interface of the terminal, the controller controls the communication interface of the terminal to switch on or off, and the battery charging control device comprises a battery connector, a main control circuit and a quick charging switch circuit;

the battery connector is coupled with an electrode of the battery, the main control circuit is coupled with the battery connector, a first switch control terminal and a second switch control terminal of the main control circuit are coupled with a first controlled terminal and a second controlled terminal of the quick charging switch circuit respectively, both a first communication terminal and a second communication terminal of the main control circuit are coupled with the communication interface, the main control circuit is also coupled with the controller, an input terminal of the quick charging switch circuit is coupled with a power wire of the communication interface, and an output terminal of the quick charging switch circuit is coupled with the battery connector;

when a regular charging is performed on the battery, the main control circuit controls the quick charging switch circuit to switch off; when a quick charging is performed on the battery, the main control circuit controls the quick charging switch circuit to switch on, and the direct current is introduced into the quick charging switch circuit via the communication interface, so as to charge the battery via the battery connector; the battery charging control method comprises acts of:

performing by the main control circuit a data communication with the external power adapter, and obtaining a charging voltage and a charging current for the battery;

determining by the main control circuit whether the charging voltage is greater than a voltage threshold and determining by the main control circuit whether the charging current is greater than a current threshold; if the charging voltage is greater than the voltage threshold and/or the charging current is greater than the current threshold, sending by the main control circuit a charging switch-off instruction, such that the controller controls the communication interface to switch off; and if the charging voltage is less than or equal to the voltage threshold and the charging current is less than or equal to the current threshold, returning to the act of performing by the main control circuit the data communication with the external power adapter and obtaining the charging voltage and the charging current for the battery.

12. The battery charging control method according to claim 11, wherein, when a quick charging is performed on the battery, the method further comprises following acts:

determining by the main control circuit whether the charging voltage for the battery is zero;

if the charging voltage for the battery is zero, controlling by the main control circuit the quick charging switch circuit to switch off and sending by the main control circuit the charging switch-off instruction, such that the controller controls the communication interface to switch off; and if the charging voltage for the battery is not zero, returning to the act of performing by the main control circuit the data communication with the external power adapter and obtaining the charging voltage and the charging current for the battery.

13. The battery charging control method according to claim 12, wherein, act comprises:

sending by the main control circuit, a charging parameter obtaining request to the external power adapter;

feeding back by the external power adapter, charging voltage information and charging current information to the main control circuit according to the charging parameter obtaining request;

obtaining by the main control circuit, the charging current and the charging voltage for the battery from the charging voltage information and the charging current information.

14. The battery charging control method according to claim 11, wherein, when a quick charging is performed on the battery, the method further comprises following acts:

detecting by the main control circuit a voltage of the battery via the battery connector, determining by the main control circuit whether the voltage of the battery is greater than a quick charging voltage threshold;

if the voltage of the battery is greater than the quick charging voltage threshold, controlling by the main control circuit the quick charging switch circuit to switch off, and determining by the main control circuit whether the charging voltage is greater than the voltage threshold and determining by the main control circuit whether the charging current is greater than the current threshold; if the charging voltage is greater than the voltage threshold and/or the charging current is greater than the current threshold, sending by the main control circuit the charging switch-off instruction, such that the controller controls the communication interface to switch off; and if the charging voltage is less than or equal to the voltage threshold and the charging current is less than or equal to the current threshold, returning to the act of performing by the main control circuit the data communication with the external power adapter and obtaining the charging voltage and the charging current for the battery and if the voltage is battery is less than or equal to the quick charging voltage threshold, determining by the main control circuit whether the charging voltage is greater than the voltage threshold and determining by the main control circuit whether the charging current is greater than the current threshold; if the charging voltage is greater than the voltage threshold and/or the charging current is greater than the current threshold, sending by the main control circuit the charging switch-off instruction, such that the controller controls the communication interface to switch off; and if the charging voltage is less than or equal to the voltage threshold and the charging current is less than or equal to the current threshold, returning to the act of performing by the main control circuit the data communication with the external power adapter and obtaining the charging voltage and the charging current for the battery.

15. The battery charging control method according to claim 14, wherein, the method further comprises following acts:
   detecting by the main control circuit an electric quantity of the battery via the battery connector, and feeding back the electric quantity to the controller.

16. The battery charging control method according to claim 15, wherein, act A comprises:
   sending by the main control circuit, a charging parameter obtaining request to the external power adapter;
   feeding back by the external power adapter, charging voltage information and charging current information to the main control circuit according to the charging parameter obtaining request;
   obtaining by the main control circuit, the charging current and the charging voltage for the battery from the charging voltage information and the charging current information.

17. The battery charging control method according to claim 14, wherein, act comprises:
   sending by the main control circuit, a charging parameter obtaining request to the external power adapter;
   feeding back by the external power adapter, charging voltage information and charging current information to the main control circuit according to the charging parameter obtaining request;
   obtaining by the main control circuit, the charging current and the charging voltage for the battery from the charging voltage information and the charging current information.

18. The battery charging control method according to claim 11, wherein, performing by the main control circuit the data communication with the external power adapter and obtaining the charging voltage and the charging current for the battery comprises following acts:
   sending by the main control circuit, a charging parameter obtaining request to the external power adapter;
   feeding back by the external power adapter, charging voltage information and charging current information to the main control circuit according to the charging parameter obtaining request;
   obtaining by the main control circuit, the charging current and the charging voltage for the battery from the charging voltage information and the charging current information.

19. The battery charging control method according to claim 11, wherein, when a quick charging is performed on the battery, the method further comprises:
   feeding back by the controller a quick charging switch-off instruction to the main control circuit at an abnormal battery temperature;
   controlling by the main control circuit the quick charging switch circuit to switch off according to the quick charging switch-off instruction.

* * * * *